(12) United States Patent
Shibata

(10) Patent No.: US 11,002,170 B2
(45) Date of Patent: May 11, 2021

(54) INJECTION DEVICE

(71) Applicant: Isuzu Motors Limited, Tokyo (JP)

(72) Inventor: Keiko Shibata, Chigasaki (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 16/622,950

(22) PCT Filed: Jun. 12, 2018

(86) PCT No.: PCT/JP2018/022291
§ 371 (c)(1),
(2) Date: Dec. 16, 2019

(87) PCT Pub. No.: WO2018/230520
PCT Pub. Date: Dec. 20, 2018

(65) Prior Publication Data
US 2020/0200059 A1    Jun. 25, 2020

(30) Foreign Application Priority Data

Jun. 16, 2017 (JP) .............................. JP2017-118601

(51) Int. Cl.
*F01N 3/20* (2006.01)
*B01D 53/90* (2006.01)
*B01D 53/94* (2006.01)

(52) U.S. Cl.
CPC ............. *F01N 3/208* (2013.01); *B01D 53/90* (2013.01); *B01D 53/9495* (2013.01);
(Continued)

(58) Field of Classification Search
CPC .... F01N 3/2066; F01N 3/208; F01N 2560/06; F01N 2610/00; F01N 2610/02;
(Continued)

(56) References Cited

U.S. PATENT DOCUMENTS

| 2010/0015022 | A1  | 1/2010 | Schmelzle et al. |
| 2015/0110711 | A1  | 4/2015 | Franco et al. |
| 2018/0045096 | A1* | 2/2018 | Ardanese ........... B01D 53/9477 |

FOREIGN PATENT DOCUMENTS

| CN | 102278177 | 12/2011 |
| CN | 102513149 | 6/2012 |

(Continued)

OTHER PUBLICATIONS

International Search Report and the Written Opinion dated Aug. 14, 2018 From the International Searching Authority Re. Application No. PCT/JP2018/022291 and Its Translation of Search Report Into English. (8 Pages).

(Continued)

*Primary Examiner* — Audrey K Bradley

(57) ABSTRACT

Provided is an injection device capable of suppressing the deposition of white products and performing an exhaust gas purification treatment. This injection device is provided with: an injection unit which is provided upstream of a selective reduction-type catalyst device provided inside an exhaust pipe constituting an exhaust passage of an internal combustion engine, and injects a urea aqueous solution or a diethylamine aqueous solution; a determination unit which determines whether white products derived from the urea aqueous solution injected by the injection part are deposited.

3 Claims, 2 Drawing Sheets

(52) U.S. Cl.
CPC .... *F01N 3/2066* (2013.01); *B01D 2251/2067* (2013.01); *F01N 2560/06* (2013.01); *F01N 2610/00* (2013.01); *F01N 2610/02* (2013.01); *F01N 2610/146* (2013.01); *F01N 2900/1602* (2013.01)

(58) Field of Classification Search
CPC ....... F01N 2610/146; F01N 2900/1602; B01D 53/90; B01D 2251/2067
See application file for complete search history.

(56) References Cited

FOREIGN PATENT DOCUMENTS

| | | |
|---|---|---|
| CN | 104271240 | 1/2015 |
| JP | 04-118133 | 10/1992 |
| JP | 2000-254495 | 9/2000 |
| JP | 2000-303826 | 10/2000 |
| JP | 2005-000814 | 1/2005 |
| JP | 2010-519025 | 6/2010 |
| JP | 2015-086792 | 5/2015 |
| JP | 2016-133089 | 6/2016 |
| JP | 2016-133089 | 7/2016 |
| JP | 2017-025796 | 2/2017 |
| WO | WO 2018/230520 | 12/2018 |

OTHER PUBLICATIONS

Notification of Office Action and Search Report dated Jan. 6, 2021 From the State Intellectual Property Office of the People's Republic of China Re. Application No. 201880036880.4. (6 Pages).

* cited by examiner

INJECTION DEVICE

TECHNICAL FIELD

The present disclosure relates to an injection device.

BACKGROUND ART

As an exhaust gas purification system used to remove NOx in exhaust gas of diesel engines mounted on vehicles such as trucks or buses, a selective catalytic reduction (SCR) system that reduces NOx to nitrogen and water using urea water or the like as a reducing agent has been developed (see, for example, Patent Literature (hereinafter abbreviated as PTL) 1).

The selective catalytic reduction system supplies urea water stored in a urea water tank to an exhaust pipe upstream of a selective reduction catalytic apparatus (SCR) and hydrolyzes urea by the heat of exhaust gas, thereby generating ammonia, and reduces NOx with the ammonia in the presence of a catalyst in the selective reduction catalytic apparatus. The urea water is injected in an appropriate amount by a urea water injector provided, for example, on an exhaust passage.

CITATION LIST

Patent Literature

PTL 1
Japanese Patent Application Laid-Open No. 2000-303826

SUMMARY OF INVENTION

Technical Problem

However, the following troubles may be caused by a urea aqueous solution injected into an exhaust pipe. That is, hydrolysis of the urea aqueous solution will become insufficient when the temperature of exhaust gas is low (for example, 200 to 250° C.) such as during low-load operation of an internal combustion engine, when the injection quantity of the urea aqueous solution is abnormally large, when injection of the urea aqueous solution continues while the flow rate of exhaust gas is low, or in other similar cases. In such cases, a large amount of white products represented by cyanuric acid generated when a urea aqueous solution is hydrolyzed attach to and deposit on a neighborhood of a nozzle of the urea water injector, a surface of a mixer placed between the urea water injector and SCR to stir the urea water solution into the exhaust gas, or a surface of the SCR. When white products deposit, for example, the exhaust pipe is clogged, deteriorating purification performance of the SCR, which might make it impossible to conduct exhaust gas purification treatment as desired.

With the conventional technique, when white products deposit, the white products are washed away using a detergent after stopping the internal combustion engine. Alternatively, by supplying fuel into the exhaust gas and oxidizing hydrocarbon in the fuel using DOC, the temperature of the exhaust gas is raised to around 400 to 500° C., thereby conducting pyrolysis treatment of the white products. However, the treatment described above is only a post-treatment conducted after white products deposit and to eliminate the need for the post-treatment, there is demand for a technique that inhibits white products from depositing.

An object of the present disclosure is to provide an injection device that allows exhaust gas purification treatment to be conducted as desired by inhibiting deposition of white products.

Solution to Problem

An injection device according the present disclosure includes:

an injection section installed on an upstream side of a selective reduction catalytic apparatus installed in an exhaust pipe that makes up an exhaust passage of an internal combustion engine, the injection section being operable to inject a urea aqueous solution or a diethylamine aqueous solution;

a determination section that determines whether white products originating from the urea aqueous solution injected by the injection section are deposited in the exhaust pipe; and an injection control section that controls the injection section to inject the diethylamine aqueous solution in a case where it is determined by the determination section that the white products are deposited.

Advantageous Effects of Invention

The present disclosure allows exhaust gas purification treatment to be conducted as desired by inhibiting deposition of white products.

DESCRIPTION OF EMBODIMENTS

Figure 1:
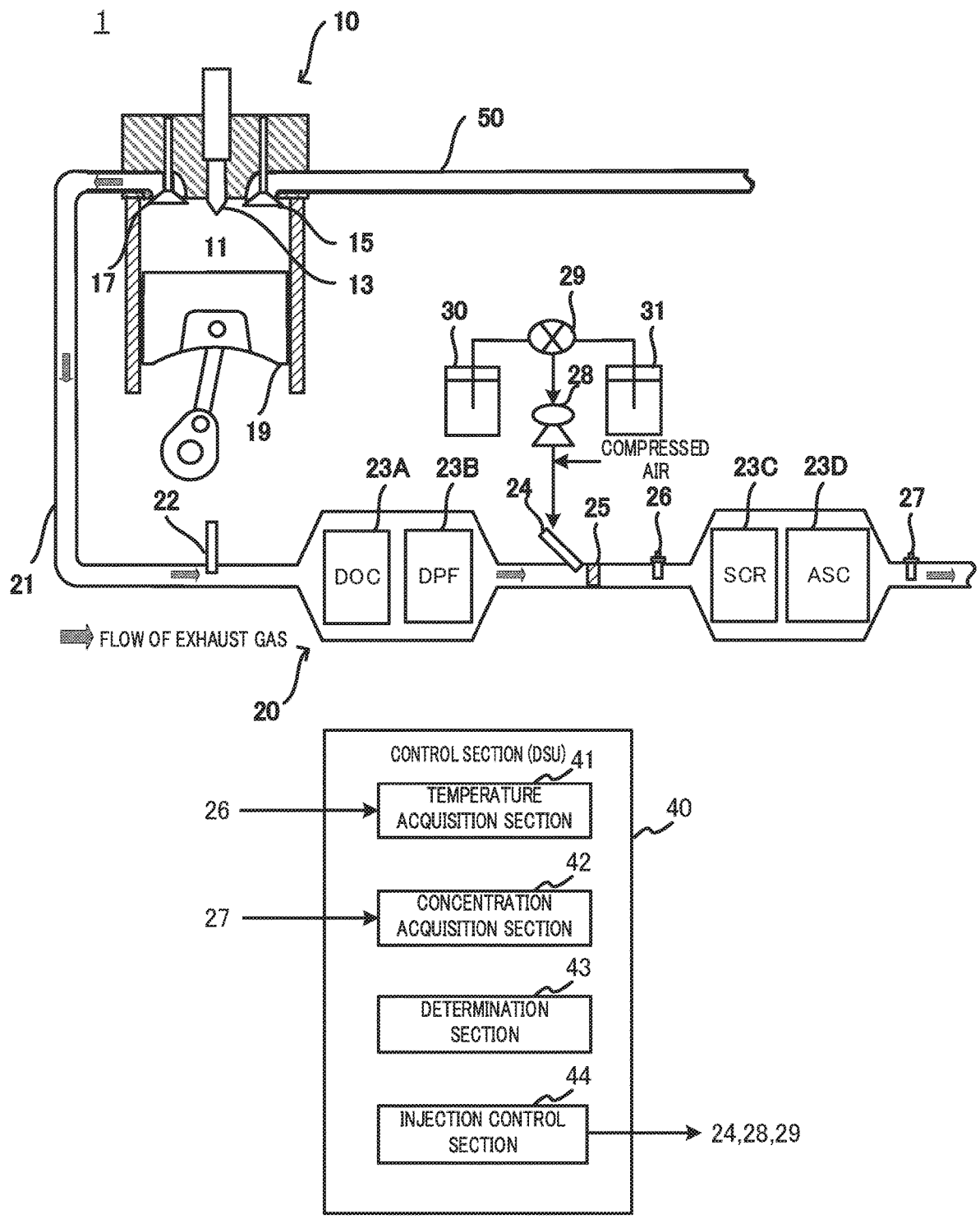
FIG. 1 is a diagram showing a configuration of a vehicle according to the present embodiment.

An embodiment of the present disclosure will be described below with reference to the accompanying drawings. FIG. 1 is a diagram showing a configuration of vehicle 1 according to the present embodiment. As shown in FIG. 1, internal combustion engine 10, exhaust system 20, and control section 40 (specifically, DSU) are mounted on vehicle 1 such as a truck or bus. Exhaust system 20 and control section 40 function as an exhaust gas purification system.

First, a configuration of internal combustion engine 10 will be described. Internal combustion engine 10 is, for example, a diesel engine. In combustion chamber 11 of internal combustion engine 10, fuel injector 13 injects fuel into combustion chamber 11. Note that fuel injector 13 may inject fuel into an intake port of combustion chamber 11. The injection of fuel is controlled by an ECM (not shown). Also, the fuel in combustion chamber 11 burns by being compressed by operation of piston 19.

Intake valve 15 and exhaust valve 17 are configured to be openable and closable. When intake valve 15 opens, fresh air is sucked into combustion chamber 11 through intake pipe 50. Also, when exhaust valve 17 opens, the exhaust gas produced by the fuel burning in combustion chamber 11 is sent out to exhaust system 20 (specifically, exhaust pipe 21).

Next, a configuration of exhaust system 20 will be described. Exhaust system 20 is installed, for example, in lower part of vehicle 1 and mainly includes exhaust pipe 21 made of metal. Exhaust pipe 21 leads the exhaust gas produced by combustion of the fuel in internal combustion engine 10 to the atmosphere (outside the vehicle).

Also, various post-treatment devices are installed in the middle of exhaust pipe 21 to purify (make harmless) the exhaust gas. According to the present embodiment, the post-treatment devices include DOC (oxidation catalyst) 23A, DPF 23B, SCR 23C (which corresponds to a "selective reduction catalytic apparatus" of the present disclosure), and ASC 23D.

DOC 23A is formed of rhodium, cerium oxide, platinum, aluminum oxide carried in a metal carrier. DOC 23A breaks down and removes hydrocarbon (HC) and carbon monoxide (CO) contained in the exhaust gas. DOC 23A also has a function to oxidize nitrogen monoxide (NO) making up most of NOx contained in the exhaust gas and produce nitrogen dioxide ($NO_2$). Using this function, NOx purification efficiency of SCR 23C can be improved.

In exhaust pipe 21, fuel supply section 22 (fuel supply injector) is placed on an upstream side (specifically, an upstream side in an exhaust gas flow direction) of DOC 23A to temporarily supply fuel into the exhaust gas, oxidize the hydrocarbon (HC) in the fuel using DOC 23A, and raise the temperature of the exhaust gas using the heat of the oxidation reaction.

DPF 23B is a monolithic honeycomb wall-flow filter in which inlets and outlets of porous ceramic honeycomb channels (cells) are sealed alternately. DPF 23B collects and removes particulate matter (PM) contained in the exhaust gas.

In exhaust pipe 21, injector 24 (which corresponds to an "injection section" of the present disclosure) used to selectively inject (specifically, spray) a urea aqueous solution or diethylamine aqueous solution is installed on a downstream side of DPF 23B (specifically, a downstream side in the exhaust gas flow direction) but on an upstream side of SCR 23C.

The urea water solution injected from injector 24 is stored in urea aqueous solution tank 30. Also, the diethylamine aqueous solution injected from injector 24 is stored in diethylamine aqueous solution tank 31. A ratio of water to diethylamine of the diethylamine aqueous solution stored in diethylamine aqueous solution tank 31 is, for example, 4:1. The ratio has been determined by experiment and the like such that white products described later can be more suitably dissolved and cleared up when the diethylamine aqueous solution is injected toward the white products.

Urea aqueous solution tank 30 and diethylamine aqueous solution tank 31 are connected to pump 28 through valve 29. Under the control of control section 40, valve 29 switches the tank to be communicated with pump 28 between urea aqueous solution tank 30 and diethylamine aqueous solution tank 31.

When urea aqueous solution tank 30 is communicated with pump 28 via valve 29, under the control of control section 40, pump 28 draws the urea aqueous solution from urea aqueous solution tank 30 and pressure-feeds the urea aqueous solution to injector 24. The urea aqueous solution is supplied with compressed air while being pressure-fed to injector 24 and is injected from injector 24.

On the other hand, when diethylamine aqueous solution tank 31 is communicated with pump 28 via valve 29, under the control of control section 40, pump 28 draws the diethylamine aqueous solution from diethylamine aqueous solution tank 31 and pressure-feeds the diethylamine aqueous solution to injector 24. The diethylamine aqueous solution is supplied with compressed air while being pressure-fed to injector 24 and is injected from injector 24.

In exhaust pipe 21, mixer 25 is installed on a downstream side of injector 24 to stir and thereby uniformly diffuse the urea aqueous solution into the exhaust gas as the solution is injected from injector 24.

In exhaust pipe 21, temperature sensor 26 is installed near an inlet of SCR 23C. Temperature sensor 26, which is used, for example, to control injection of the urea aqueous solution, detects the temperature of the exhaust gas and outputs a signal to control section 40, indicating the temperature.

SCR 23C is, for example, columnar in shape and has a honeycomb carrier made of ceramic. Honeycomb wall surfaces carry, or are coated with, a catalyst such as zeolite or vanadium.

SCR 23C such as described above is placed on a downstream side of DPF 23B in exhaust pipe 21. Also, in exhaust pipe 21, the urea aqueous solution as a reducing agent is injected by injector 24 between DPF 23B and SCR 23C and supplied to the exhaust gas passing through DPF 23B. As a result, the urea aqueous solution is hydrolyzed into ammonia. Near a surface layer of SCR 23C, nitrogen oxides (so-called NOx) in the exhaust gas containing ammonia are broken down into nitrogen and water by a catalytic effect (reduction reaction). Consequently, the nitrogen oxides in the exhaust gas are removed.

Here, the hydrolysis takes place when the temperature of the exhaust gas passing through SCR 23C is equal to or higher than a predetermined temperature (for example, 200° C.). Thus, according to the present embodiment, injector 24 supplies the urea aqueous solution to the exhaust gas in exhaust pipe 21 when the temperature of the exhaust gas flowing into SCR 23C is 200° C. or above. The injection of the urea aqueous solution is controlled by control section 40. Note that the predetermined temperature (200° C.) is established appropriately and suitably through experiments, simulations, and the like in a design and development stage of exhaust system 20 by taking into consideration the reaction temperature of ammonia, NOx and the like.

ASC 23D (ammonia slip catalyst), which is a post-stage oxidation catalyst, has a configuration similar to that of DOC 23A and is placed immediately downstream of SCR 23C in exhaust pipe 21. ASC 23D mainly oxidizes and removes ammonia slipping without being used in reduction reactions in SCR 23C, such that the slipping ammonia will not be released into the atmosphere. Besides, ASC 23D may have a function similar to that of SCR 23C.

Concentration sensor 27 is installed on a downstream side of ASC 23D in exhaust pipe 21. Concentration sensor 27 detects the concentration of the NOx contained in the exhaust gas passing through ASC 23D and outputs a signal to control section 40, indicating the concentration.

Water, nitrogen, and carbon dioxide produced when the exhaust gas is treated by the above post-treatment devices are discharged into the atmosphere through a muffler and the like (not shown).

Incidentally, hydrolysis of the urea aqueous solution will become insufficient when the temperature of exhaust gas is low such as during low-load operation of internal combustion engine 10, when the injection quantity of the urea aqueous solution is abnormally large, when injection of the urea aqueous solution continues while the flow rate of exhaust gas is low, or in other similar cases. In such cases, a large amount of white products (biuret, cyanuric acid, ammeline, ammelide, and melamine) generated when a urea aqueous solution is hydrolyzed attach to and deposit on a neighborhood of a nozzle of injector 24, a surface of mixer 25, or a surface of SCR 23C. When white products deposit, for example, exhaust pipe 21 is clogged, deteriorating purification performance of SCR 23C, which might make it impossible to conduct exhaust gas purification treatment as desired.

Thus, according to the present embodiment, control section 40 determines whether white products originating from the urea aqueous solution injected by injector 24 are deposited in exhaust pipe 21 and performs control to inject a diethylamine aqueous solution when it is determined that white products are deposited. The injected diethylamine aqueous solution dissolves and clears up the white products deposited on the neighborhood of the nozzle of injector 24, the surface of mixer 25, or the surface of SCR 23C. This allows exhaust gas purification treatment to be conducted as desired by inhibiting deposition of white products.

Control section 40 includes a CPU (Central Processing Unit), a ROM (Read Only Memory) storing a control program, and a working memory such as a RAM (Random Access Memory). The CPU reads the control program out of the ROM, load the control program into the RAM, and controls execution of various processes in collaboration with the loaded control program.

As shown in FIG. 1, control section 40 includes temperature acquisition section 41, concentration acquisition section 42, determination section 43, and injection control section 44.

Temperature acquisition section 41 accepts as input a signal outputted from temperature sensor 26 and acquires the temperature of the exhaust gas passing through exhaust pipe 21.

Concentration acquisition section 42 accepts as input a signal outputted from concentration sensor 27 and acquires the concentration of the NOx contained in the exhaust gas passing through exhaust pipe 21.

Determination section 43 determines whether white products originating from the urea aqueous solution injected by injector 24 are deposited in exhaust pipe 21. According to the present embodiment, determination section 43 determines that white products are deposited in exhaust pipe 21 when the concentration acquired by concentration acquisition section 42 is equal to or higher than a predetermined concentration, but determines that white products are not deposited in exhaust pipe 21 when the concentration acquired by concentration acquisition section 42 is lower than the predetermined concentration. Here, the case in which the concentration acquired by concentration acquisition section 42 is equal to or higher than a predetermined concentration is a case in which some amount of white products is deposited on the neighborhood of the nozzle of injector 24, the surface of mixer 25, or the surface of SCR 23C, deteriorating the purification performance of SCR 23C and thereby making the concentration of NOx on a downstream side of SCR 23C higher than that of the normal case by an amount corresponding to the deterioration of the purification performance of SCR 23C.

When it is determined by determination section 43 that white products are deposited in exhaust pipe 21, injection control section 44 controls injector 24, pump 28, and valve 29 such that the diethylamine aqueous solution will be injected toward the surface of mixer 25, in particular.

Figure 2:
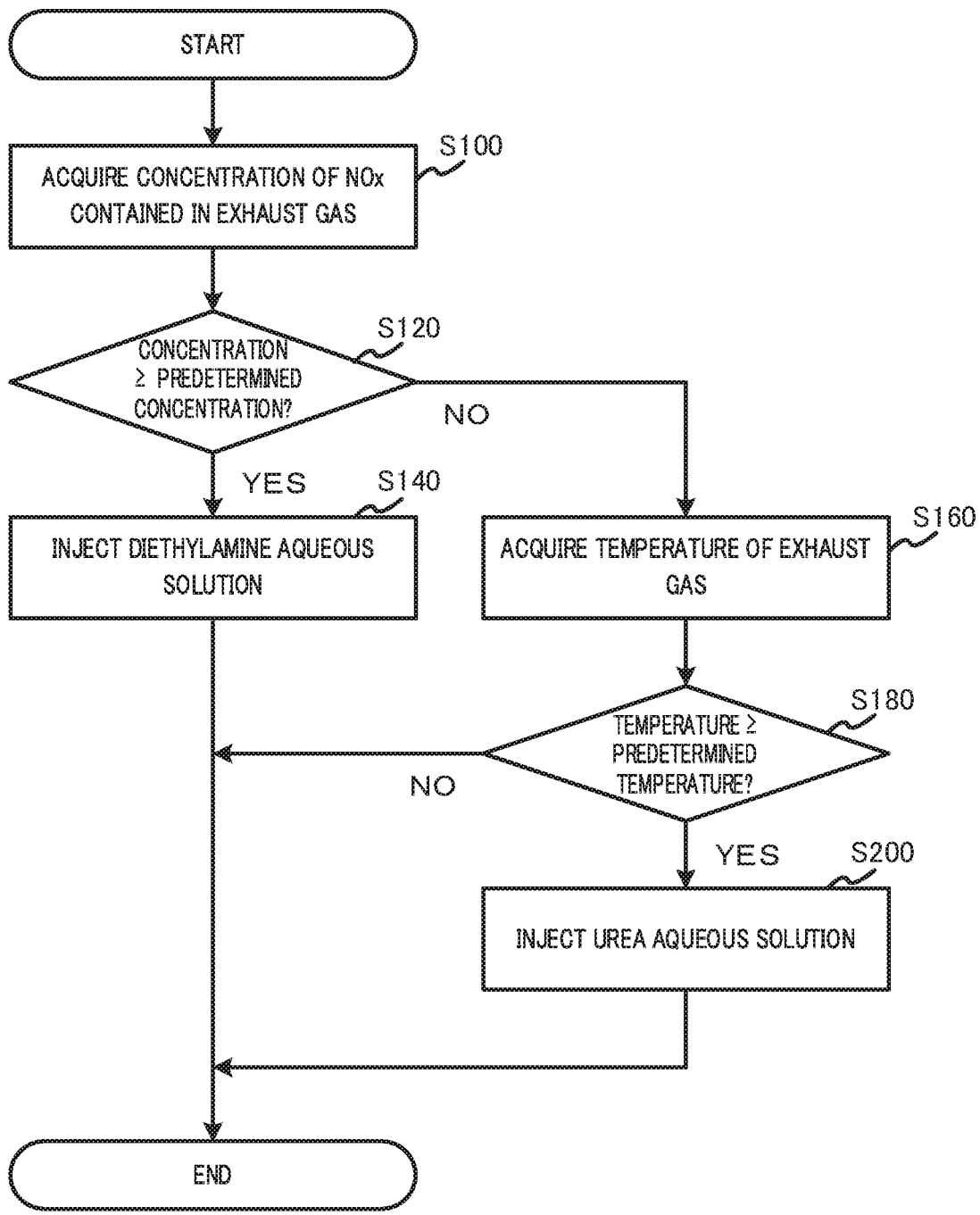
FIG. 2 is a flowchart showing an injection control process according to the present embodiment.

Next, an example of an injection control process of control section 40 according to the present embodiment will be described with reference to the flowchart of FIG. 2. The injection control process of FIG. 2 is performed after every lapse of a predetermined time while internal combustion engine 10 is operating.

First, concentration acquisition section 42 accepts as input the signal outputted from concentration sensor 27 and acquires the concentration of the NOx contained in the exhaust gas passing through exhaust pipe 21 (step S100). Next, determination section 43 determines whether the concentration acquired by concentration acquisition section 42 is equal to or higher than the predetermined concentration (step S120).

When it is found as a result of the determination that the concentration acquired by concentration acquisition section 42 is equal to or higher than the predetermined concentration (YES in step S120), determination section 43 determines that white products originating from the urea aqueous solution injected by injector 24 are deposited in exhaust pipe 21. Then, injection control section 44 controls injector 24, pump 28, and valve 29 such that the diethylamine aqueous solution will be injected (step S140). When the process of step S140 is completed, control section 40 thereby finishes the process of FIG. 2.

On the other hand, when the concentration acquired by concentration acquisition section 42 is not equal to or higher than the predetermined concentration (NO in step S120), temperature acquisition section 41 accepts as input the signal outputted from temperature sensor 26 and acquires the temperature of the exhaust gas passing through exhaust pipe 21 (step S160). Next, determination section 43 determines whether the temperature acquired by temperature acquisition section 41 is equal to or higher than the predetermined temperature (step S180). Here, the predetermined temperature is a temperature (200° C., according to the present embodiment) at which the urea aqueous solution injected from injector 24 is hydrolyzed into ammonia.

When it is found as a result of the determination that the temperature acquired by temperature acquisition section 41 is not equal to or higher than the predetermined temperature (NO in step S180), control section 40 finishes the process of FIG. 2. On the other hand, when the temperature acquired by temperature acquisition section 41 is equal to or higher than the predetermined temperature (YES in step S180), injection control section 44 controls injector 24, pump 28, and valve 29 such that the urea aqueous solution will be injected (step S200). When the process of step S200 is completed, control section 40 finishes the process of FIG. 2.

As described in detail above, according to the present embodiment, an injection device includes an injection section (injector 24) installed on an upstream side of a selective reduction catalytic apparatus (SCR 23C) installed in exhaust pipe 21 that makes up an exhaust passage of internal combustion engine 10, the injection section being operable to inject a urea aqueous solution or a diethylamine aqueous solution; determination section 43 that determines whether white products originating from the urea aqueous solution injected by the injection section are deposited in exhaust pipe 21; and injection control section 44 that controls the injection section to inject the diethylamine aqueous solution when it is determined by determination section 43 that the white products are deposited.

According to the present embodiment configured in this way, when it is determined that white products originating from the urea aqueous solution injected by injector 24 are deposited, control section 40 causes the diethylamine aqueous solution to be injected. The injected diethylamine aqueous solution dissolves and clears up the white products deposited on the neighborhood of the nozzle of injector 24, the surface of mixer 25, or the surface of SCR 23C. This allows exhaust gas purification treatment to be conducted as desired by inhibiting deposition of white products.

Note that in the above embodiment, description has been given of a case in which it is determined that white products are deposited when NOx concentration in the exhaust gas passing through exhaust pipe 21 on the downstream side of SCR 23C is equal to or higher than a predetermined concentration, but the present disclosure is not limited to this. For example, it may be determined that white products are deposited when the temperature of exhaust gas is low such as during low-load operation of internal combustion engine 10, when the injection quantity of the urea aqueous solution is abnormally large, when injection of the urea aqueous solution continues while the flow rate of exhaust gas is low, or when other similar conditions are satisfied.

Also, in the above embodiment, description has been given of a case in which injector 24 selectively injects a urea aqueous solution or diethylamine aqueous solution, but the present disclosure is not limited to this. For example, an injector that injects a urea aqueous solution and an injector that injects a diethylamine aqueous solution may be installed separately.

Also, the embodiment described above merely illustrates a concrete example of implementing the present disclosure and are not to be interpreted as limiting the technical scope of the present disclosure. That is, the present disclosure can be implemented in various forms without departing from the spirit and scope or major features of the present disclosure.

The present application is based on Japanese Patent Application (Japanese Patent Application No. 2017-118601), filed on Jun. 16, 2017, which is incorporated herein by reference.

INDUSTRIAL APPLICABILITY

The present disclosure is suitable for use as an injection device that allows exhaust gas purification treatment to be conducted as desired by inhibiting deposition of white products.

REFERENCE SIGNS LIST

1 Vehicle
10 Internal combustion engine
11 Combustion chamber
13 Fuel injector
15 Intake valve
17 Exhaust valve
19 Piston
20 Exhaust system
21 Exhaust pipe
22 Fuel supply section
23A DOC
23B DPF
23C SCR
23D ASC
24 Injector
25 Mixer
26 Temperature sensor
27 Concentration sensor
28 Pump
29 Valve
30 Urea aqueous solution tank
31 Diethylamine aqueous solution tank
40 Control section
41 Temperature acquisition section
42 Concentration acquisition section
43 Determination section
44 Injection control section
50 Intake pipe

What is claimed is:

1. An injection device, comprising:
an injector installed on an upstream side of a selective reduction catalytic apparatus installed in an exhaust pipe that makes up an exhaust passage of an internal combustion engine, the injector being operable to switchingly inject a urea aqueous solution or a diethylamine aqueous solution; and
a hardware processor that determines whether white products originating from the urea aqueous solution injected by the injector are deposited in the exhaust pipe and controls the injector to inject the diethylamine aqueous solution in a case where it is determined that the white products are deposited.

2. The injection device according to claim 1, wherein, when NOx concentration in exhaust gas passing through the exhaust pipe on a downstream side of the selective reduction catalytic apparatus is equal to or higher than a predetermined concentration, the hardware processor determines that the white products are deposited.

3. The injection device according to claim 2, wherein, in a case where it is determined that the white products are not deposited, the hardware processor controls the injector to inject the urea aqueous solution when temperature of the exhaust gas is equal to or higher than a predetermined temperature.

* * * * *